United States Patent [19]

Hammond, Jr.

[11] 4,134,736

[45] Jan. 16, 1979

[54] STEAM-POLYMER SEPARATION APPARATUS

[75] Inventor: Leon F. Hammond, Jr., Lugoff, S.C.

[73] Assignee: E. I. Du Pont de Nemours and Company, Wilmington, Del.

[21] Appl. No.: 880,075

[22] Filed: Feb. 22, 1978

[51] Int. Cl.² .................. B01D 47/16; B01D 1/24
[52] U.S. Cl. ........................ 159/3; 55/199; 366/290; 159/481; 422/135
[58] Field of Search .............. 23/283, 285, 260; 55/199; 366/290

[56] References Cited

U.S. PATENT DOCUMENTS

| | | | |
|---|---|---|---|
| 3,046,099 | 7/1962 | Willey, Jr. | 23/285 |
| 3,113,843 | 12/1963 | Li | 23/285 |
| 3,253,892 | 5/1966 | Brignac et al. | 23/285 |
| 3,361,537 | 1/1968 | Ferrante | 23/283 |
| 3,640,509 | 2/1972 | Inamura et al. | 366/300 |
| 3,778,974 | 12/1973 | Iwasyk et al. | 55/199 |

Primary Examiner—James H. Tayman, Jr.

[57] ABSTRACT

The spiral agitator in a vessel for separating steam from polymer is modified by providing holes in the ribbon flight at locations adjacent to the locations where the ribbon flight is supported by struts for the purpose of allowing the polymer to flow through the holes and sweep the area directly behind the struts to prevent gel buildup in these locations.

4 Claims, 6 Drawing Figures

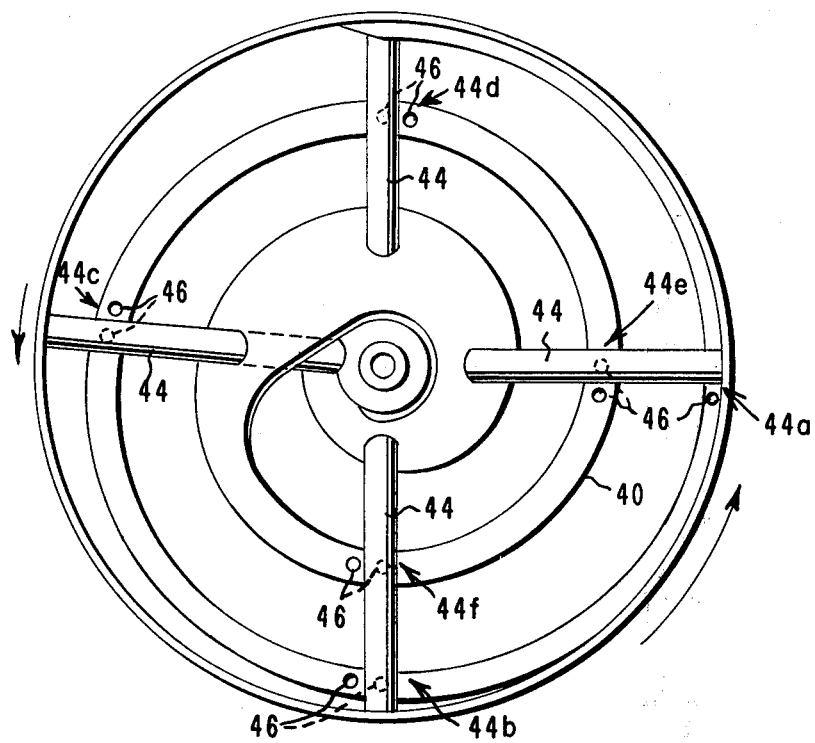
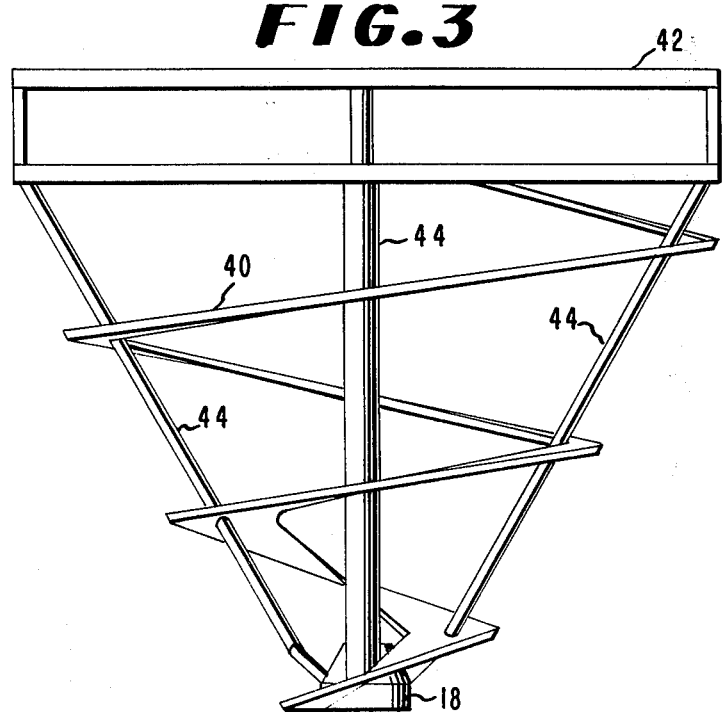

FIG.4
FIG.5
FIG.6
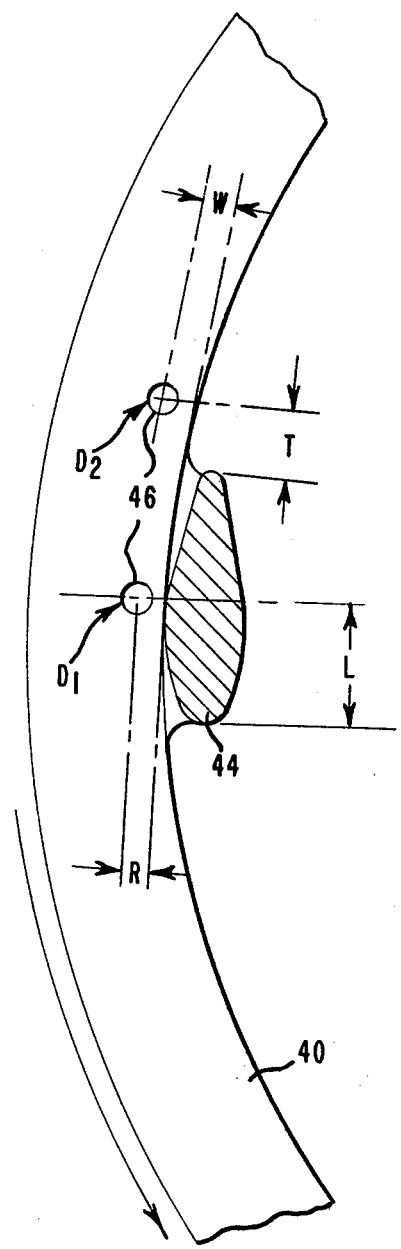
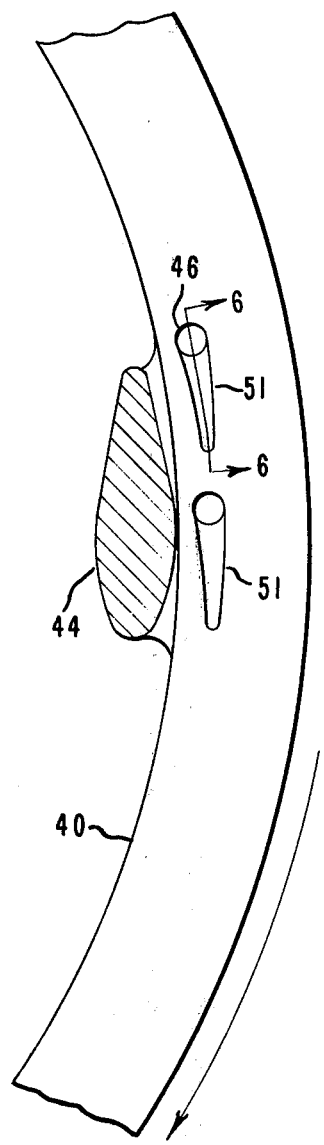
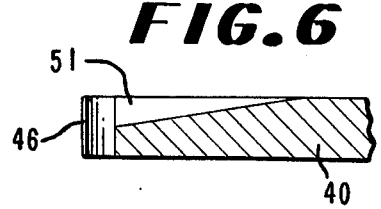

STEAM-POLYMER SEPARATION APPARATUS

DESCRIPTION

Technical Field

This invention relates to an apparatus for converting a liquid of low viscosity into a liquid of high viscosity by removal of a volatile material, being particularly adapted for polycondensation reactions in which volatile material is removed and a polymeric material of high viscosity is produced which remains in a liquid state at the temperature prevailing during the reaction.

BACKGROUND ART

The commercial preparation of most linear condensation polymers such as polyamides or polyesters involves heating monomeric starting materials to cause progressive condensation with loss of low molecular weight volatile material until the desired molecular weight level is achieved. The process is usually carried out in two or more stages with intermediate formation of a low molecular weight, low viscosity polymeric liquid which is then passed through finishing vessels which are maintained at proper temperatures and low pressures.

The problems associated with the proper design of polymer finishers have been recognized and described in the prior art. A finisher such as that illustrated by Ferrante in FIG. 1 of U.S. Pat. No. 3,361,537 functions to produce polymer with uniform viscosity. However, it has been found that gel builds up behind the struts that support the spiral ribbon agitator, particularly where the struts are attached to the ribbon flight. The polymer is highly viscous at this 5 point in the process and stagnates in areas directly behind the struts and adjacent to the ribbon flight surface. The gel builds up in time to such an extent that portions break loose, drop into the melt and are carried off into the polymer stream. The gel slough is subsequently subdivided into smaller particles as it passes through the various downstream pumps and ultimately is fed to the spinning machine where it causes serious discontinuties. To avoid the effects of gel sloughs, finishers must be cleaned at rather frequent intervals. This is costly and, since a slough cannot be predicted, a scheduled finisher clean-up often fails to avert a process upset.

DISCLOSURE OF THE INVENTION

This invention provides an improved polymer finishing apparatus which is particularly useful for preparing high viscosity polymer and with which gel formation behind the struts that support the spiral ribbon agitator, is reduced substantially. The finishing apparatus includes an upright cylindrical polymerization vessel having an inlet for liquid near its upper end, an outlet for liquid adjacent its bottom, an outlet for vapor near its upper end, a spiral transfer means including a screw mounted on a rotatable shaft extending through the bottom of the vessel for rotation within the vessel, said spiral ribbon flight extending upward from the transfer screw and a plurality of radial spaced struts interconnecting the spiral ribbon flight and the transfer screw. The improvement comprises a plurality of holes through the ribbon flight at locations adjacent locations where the struts connect to the spiral ribbon flight.

BRIEF DESCRIPTION OF THE DRAWINGS

FIG. 2 is a plan view of the ribbon agitator;

FIG. 3 is a fragmentary enlargement of a portion of FIG. 1 showing the ribbon agitator.

FIG. 4 is a fragmentary top view showing the relationship of the location of the holes in the ribbon agitator to the location where the strut connects the ribbon flight of the agitator.

FIG. 5 is a bottom view of FIG. 4.

FIG. 6 is a section view taken along line 6—6 of FIG. 5.

BEST MODE

Figure 1:
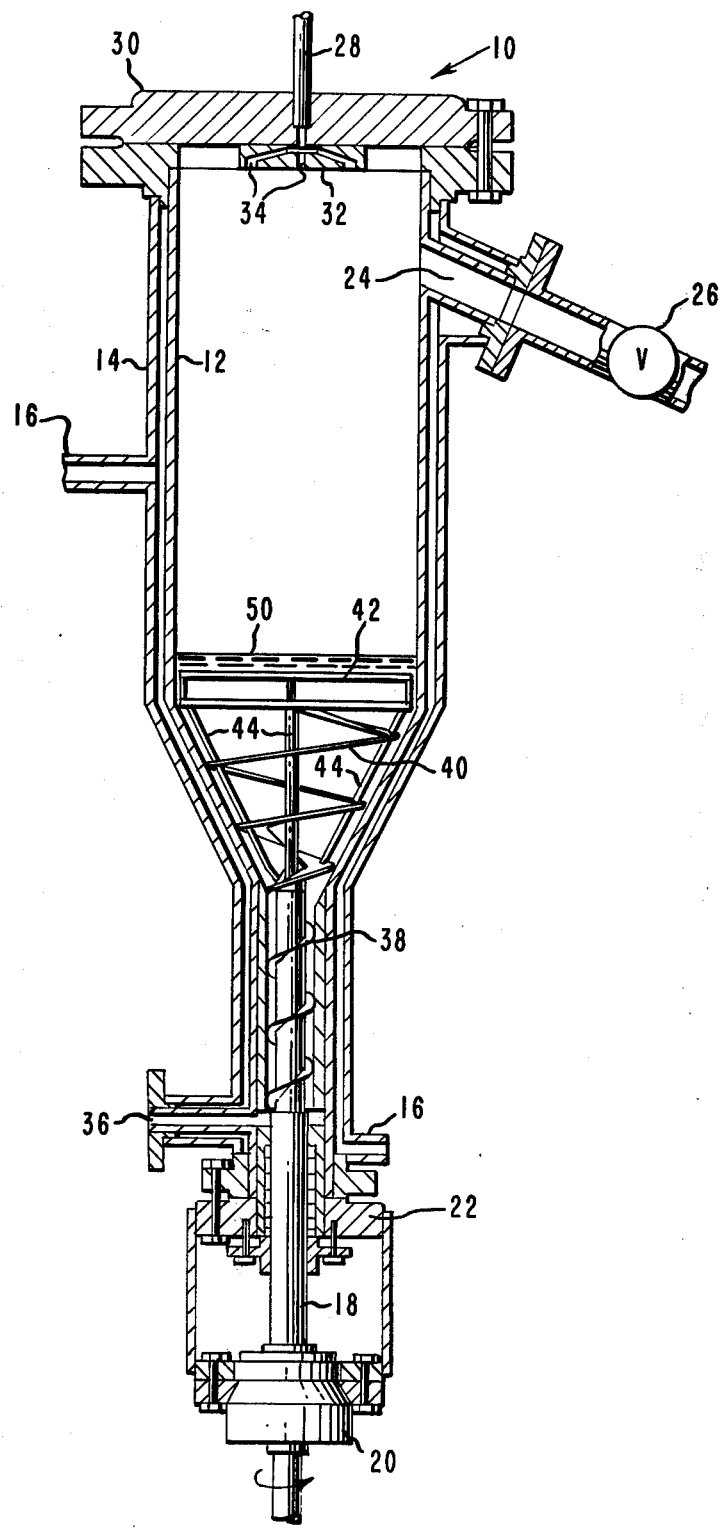
FIG. 1 is an elevational section of a finishing apparatus into which the modified ribbon agitator of the present invention has been incorporated.

The apparatus embodiment chosen for purposes of illustration has been designated generally at 10. It includes an upright tubular vessel 12 surrounded by a heating jacket 14 equipped with supply and return nozzles 16 in communication with an external supply of a suitable heat transfer medium. A shaft 18 extends through the bottom of vessel 12 and below the point of entry is journaled in a bearing 20 forming part of a support assembly 22 which closes off the lower end of vessel 12 and heating jacket 14. An exhaust port 24 is provided at the upper end of vessel 12 with the port being connected to a valve 26. A polymer inlet pipe 28 extends through flanged cover 30 and terminates in a distribution head 32. Passageways 34 in distribution head 32 communicate with inlet pipe 28 and the interior of vessel 12. A polymer discharge port 36 is provided at the lower end of the vessel.

As illustrated, vessel 12 narrows from its maximum diameter defined as a separation zone to its minimum diameter defined as a transfer zone to define as an intermediate, frustoconical, feed zone. A screw 38 is formed on shaft 18, as shown, in the transfer zone. A spiral ribbon flight agitator 40 is attached to the end of shaft 18 and is within the area defined as the feed zone. Agitator flight 40 terminates in a cage structure 42 at the bottom of the separation zone.

In FIGS. 2 and 3 the spiral ribbon flight 40 is shown supported by four vertically oriented struts 44. The struts have a streamlined aerodynamic shape (as best seen in FIG. 4) to minimize flow disturbances. The struts are welded to the inside of the ribbon flight at six locations, designated 44a, 44b, 44c, 44d, 44e, and 44f, and pass through the ribbon flight at other locations below these where the ribbon is wider. Holes 46 are drilled through the ribbon flight 40 perpendicular to the plane of the ribbon flight. In the embodiment illustrated there are two holes at each of the locations 44b through 44f with one hole being located adjacent the center of the strut and one hole adjacent the trailing edge of the strut. (Only one hole is located at position 44a.) The location and size of the holes in an embodiment constructed and operated appear in the Table below. The various dimensions are indicated on FIG. 4.

TABLE

| LOCATION | (DIMENSIONS - cm.) | | | | | |
|---|---|---|---|---|---|---|
| | $D_1$ | $D_2$ | L | R | T | W |
| 44a |  | 1.27 |  |  | 1.90 | 1.27 |
| 44b | 0.95 | 1.27 | 3.18 | 1.75 | 1.90 | 1.11 |
| 44c | 1.11 | 1.27 | 2.54 | 0.48 | 1.90 | 1.27 |
| 44d | 1.11 | 1.27 | 2.22 | 2.54 | 3.18 | 1.90 |

TABLE-continued

| LOCATION | (DIMENSIONS - cm.) | | | | | |
|---|---|---|---|---|---|---|
| | $D_1$ | $D_2$ | L | R | T | W |
| 44e | 1.11 | 1.27 | 3.18 | 2.22 | 1.90 | 1.90 |
| 44f | 1.27 | 1.43 | 3.18 | 2.38 | 1.90 | 1.59 |

As seen in FIG. 5, a tapered groove 51 is formed in the lower surface of the spiral ribbon flight 40 leading into each hole 46. The apex of the taper groove points in the direction of rotation of the spiral ribbon flight. This structure facilitates entrance of polymer into the holes 46.

In operation, the finishing apparatus 10 is maintained at an interior temperature above the polymer melting point by circulating a heat transfer medium through jacket 14. Liquid polymer is introduced through head 32 and falls to the melt pool. In passing through distributor head 32, the polymer is divided into several paths in order to increase the exposed surface area as it falls through the separation zone where steam diffuses from the polymer and passes out vent port 24. The melt level 50 is maintained slightly above cage structure 42. Shaft 18 is driven in the direction indicated (FIG. 1) by a drive means (not shown) suitably connected to its lower end. Polymer is continuously scraped from the vessel wall by cage 42 and spiral flight 40 and urged downwardly into the feed zone by flight 40. The polymer is compressed, voiding any remaining steam, fed through the transfer zone and uniformly discharged from finisher 10 through pipe 36 by screw 38, the action and fitting of which also serve as an exit seal.

As the polymer is compressed by ribbon flight 40, polymer flows up through the holes 46 and sweeps the area directly behind the struts 44 to prevent gel buildup at these locations.

EXAMPLE

Apparatus similar to that shown in the drawing was operated for a six-month period producing nominal 70 RV polyhexamethylene adipamide. During the period approximately 450 kilograms of yarn per month was lost due to finisher gel sloughs. In a prior period using unmodified ribbon agitators (without holes 46) losses due to gel sloughs were approximately 5000 kilograms per month.

Although in the preferred embodiment illustrated in FIGS. 1–6 the holes are perpendicular to the plane of the ribbon agitator 40, holes angled through the ribbon flight would also work. The angle could range from 90 degrees (perpendicular to the ribbon flight) to angle less than that as long as the bottom of the hole is pointing in the direction of rotation.

The apparatus disclosed herein is useful in the production of high viscosity polyamides in a rapid and continuous manner and permits appreciable saving in the finishing operation. Aside from its use in continuous polyamide reactions, the apparatus has general utility in the separation of volatile materials from any viscous liquid or semi-solid, especially those subject to thermal degradation.

I claim:

1. In an apparatus for separating steam from viscous polymer including an upright tubular vessel having an outlet adjacent the bottom thereof, a transfer screw having a rotatable drive shaft extending through said bottom, a spiral ribbon flight extending upward from said screw and plurality of radially spaced struts interconnecting said spiral ribbon flight and said transfer screw, the improvement comprising: said ribbon flight having a plurality of holes therethrough between its upper and lower surfaces at locations adjacent the locations where the struts connect to said spiral ribbon flight.

2. The apparatus as defined in claim 1, there being a tapered groove in the lower surface of the spiral flight leading into each hole, the apex of said tapered groove pointing in the direction of rotation of said spiral ribbon flight.

3. The apparatus as defined in claim 1, there being at least one hole located adjacent the center of said struts and at least one hole located adjacent the trailing edge of said struts.

4. The apparatus of claim 1, said holes being angled from the top surface to the bottom surface of said spiral screw flight in the direction of rotation of the screw flight.

* * * * *